(No Model.)
J. B. LEACH.
BAKING AND ROASTING PAN.
No. 352,136. Patented Nov. 9, 1886.
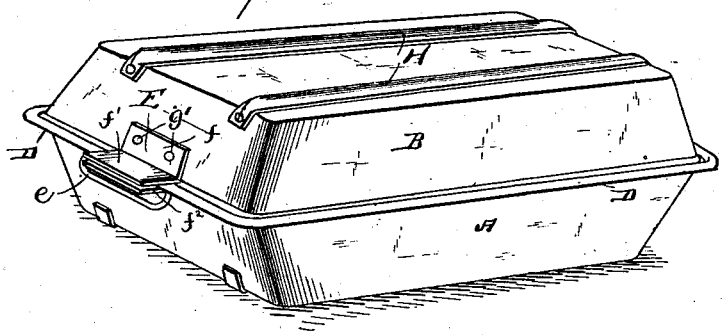
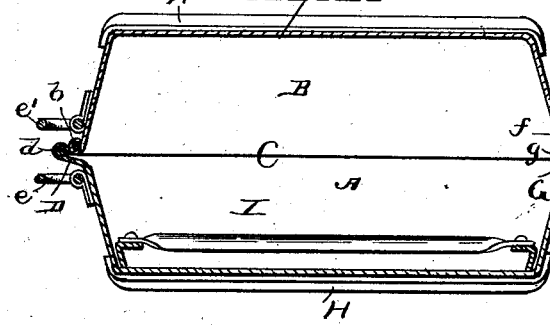
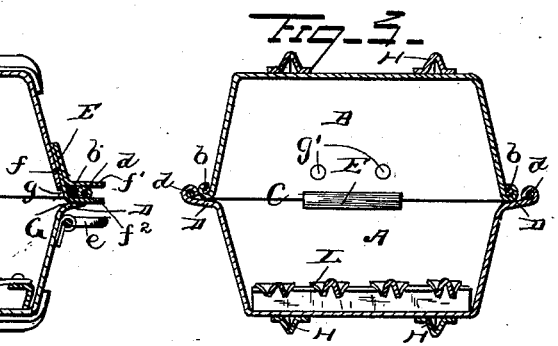
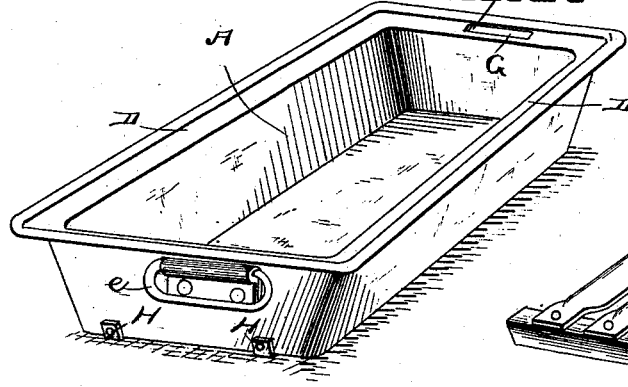
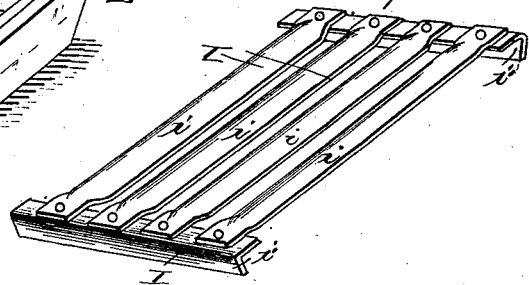
Witnesses
Inventor
Joseph B. Leach
By his Attorneys

UNITED STATES PATENT OFFICE.

JOSEPH B. LEACH, OF ROBERTS, ILLINOIS.

BAKING AND ROASTING PAN.

SPECIFICATION forming part of Letters Patent No. 352,136, dated November 9, 1886.

Application filed May 15, 1886. Serial No. 202,310. (No model.)

*To all whom it may concern:*

Be it known that I, JOSEPH B. LEACH, a citizen of the United States, residing at Roberts, in the county of Ford and State of Illinois, have invented a new and useful Improvement in Baking and Roasting Pans, of which the following is a specification.

My invention is an improvement in baking and roasting pans; and it consists of the peculiar construction and arrangement of the various parts for service, substantially as hereinafter fully set forth, and particularly pointed out in the claim.

The object of my invention is to provide an improved baking and roasting pan in which bread, cakes, &c., can be evenly and thoroughly baked, and in which meats or a fowl can be uniformly roasted, without requiring the cook or attendant to "baste" the same, and thereby give the meat or fowl the very desirable juicy state which it is desired to attain by baking-pans of the class to which my invention relates.

A further object of my invention is to provide the pan with means whereby the exterior thereof is prevented from coming in contact directly with the walls of the oven, and thus secure a circulation and more uniform application of heat thereto to evenly bake or roast the contents of the pan, to provide means for connecting the sections of the pan together in such manner that they can be readily separated to permit inspection of the contents thereof without removing the pan from the oven and without the sections becoming detached, and to provide means for preventing the escape of steam from the cooking-chamber, and for securing a circulation of steam therein, all as presently described.

In the accompanying drawings, Figure 1 is a perspective view of a baking or roasting pan embodying my invention. Fig. 2 is a central longitudinal vertical sectional view. Fig. 3 is a vertical cross-section. Fig. 4 is a perspective view of the bottom pan-section. Fig. 5 is a detached perspective view of the removable grate.

Referring to the drawings, in which like letters of reference denote corresponding parts in all the figures, A and B designate the bottom and top sections of my improved baking and roasting pan, which are each provided with outwardly-flared or inclined sides and ends, and are of approximately the same shape and size, so that when they are fitted together with their edges in contact a cooking-chamber, C, is formed between them, in which is placed the article to be cooked. The bottom section, A, of the pan is provided at its upper edges with an outwardly-flared or inclined flange, D, that lies at an angle to the inclined walls of the section, and the outer edges of this flange are doubled or bent upon themselves and inclose a wire, $d$, as clearly shown. The lower edges of the flared walls of the top section are doubled upon themselves and inclose a wire, $b$, thus forming a wired edge, and the top section, B, fits or rests on the flange D of the bottom section, A, and within the wired edge $d$ thereof, thus forming a tight joint between the pan-sections, to prevent the escape of heat from the chamber C and retain it therein to utilize it in cooking the article in the pan. By having the wired pan-sections they are prevented from injuring the hands, and at the same time increase the strength of the sections, and the inclined flange D serves as a bearing for the top section, and efficiently prevents the escape of hot air or steam from the cooking-chamber. The bottom section, A, is provided at its ends with bails or handles $e$, for its convenient manipulation, and the top section, B, is provided at one end with a similar bail, $e'$, and at its opposite end with a keeper, F. This keeper is formed of a single piece of sheet metal, which is doubled or bent upon itself to provide a body-plate, $f$, and the lateral arms $f'$ $f^2$, which are bent at an angle to the body-plate $f$. These arms $f'$ $f^2$ are arranged at an angle to the said body-plate of the keeper, so that when the keeper is affixed to the lower edge of one of the end walls of the upper pan-section the arms $f'$ $f^2$ project beyond the said end walls. The arms are arranged a short distance apart and parallel with each other, and the lower arm, $f^2$, is passed through a slot which is formed in the lower edge of one of the end walls of the upper pan-section, B, as shown very clearly in Fig. 2 of the drawings. The keeper is riveted, as at $g'$, very securely to the lower end of one of the end walls of the upper pan-section. The inclined flange D at one end of the lower pan-section, A, is provided with a longitudinal slot, G, which is shown very clearly in Fig. 4, and through the slot passes the lower arm, $f^2$, of the keeper to connect the upper and lower sections of the pan together.

It will be seen that the wired edge $b$ of the upper pan-section fits between the arms $f'$ $f^2$ of the keeper, and the said arms project or extend beyond the edges of the pan-section A, whereby the opposite end of the section B can be readily elevated by grasping the bail $e'$, without danger of releasing the keeper-arms from engagement with the slotted edge of the section A. The pan-sections are thus securely connected, and the contents of the pan can be readily inspected without removing the upper one, and the sections can be readily separated, when desired.

The bottom of the section A and top of section B are provided with longitudinal cleats H, which are arranged longitudinally of the sections, and near their side edges, as shown. Each of these cleats is made V-shaped in cross-section, and at their ends they are flattened down and bent over the edges of the bottom and top of the sections A B, respectively, and secured to the flaring end walls thereof by rivets, as shown. By means of these cleats the pan is elevated out of direct contact with the walls of the oven, so that the heat does not strike the pan directly, which is liable to scorch the contents of the pan, and a free circulation of heat is permitted beneath the pan, and the cleats rest on the bottom of the oven, and serve as ways or supports for the pan and prevent any harsh or grating noise in sliding the pan in and out of the oven.

I designates a removable grating, which is fitted in the bottom of the section A, and this grating is provided with a series of equidistant longitudinal bars, $i$, which are of V shape in cross-section, and the end cross-bars I, to which the flattened ends of the bars $i$ are riveted or secured, the cross-bars having vertical flanges $i'$, which rest on the bottom of the section A, and elevate the bars $i$ out of contact therewith, to permit a free circulation of heat or steam beneath the grating and between the bars $i$ thereof.

When bread is to be baked in my improved pan, the grate I is removed and the dough placed in the section A, and the section B is then fitted thereto, and the device is placed in the oven, where it is allowed to remain a sufficient length of time and then removed. The heat is retained and circulates freely in the cooking interior of the pan, and the bread is more uniformly and thoroughly and quickly baked thereby.

When meat or fowl is to be roasted, the grating I is fitted in the section A and water or grease put beneath the grating.

Having thus fully described my invention, what I claim as new, and desire to secure by Letters Patent, is—

As a new article of manufacture, a baking or roasting pan consisting of an upper and lower section of substantially uniform size and form, and detachably fitted together to form a cooking-chamber, the lower section of the pan having an outwardly-inclined wired flange, D, at its upper edge, and a slot, G, in the said flange at one end of the pan, and the upper section resting on the said flange within the wired edge thereof, and having a fixed keeper at its lower edge provided with the outwardly-extending arms $f'$ $f^2$, one of which passes through the slot G, to connect the upper and lower sections of the pan, substantially as described.

In testimony that I claim the foregoing as my own I have hereto affixed my signature in presence of two witnesses.

JOSEPH B. LEACH.

Witnesses:
W. J. THRASHER,
W. B. FLORA.